(12) United States Patent
Tafreshnia et al.

(10) Patent No.: US 12,085,135 B2
(45) Date of Patent: Sep. 10, 2024

(54) DECOUPLER FOR ENDLESS DRIVE ARRANGEMENT

(71) Applicant: LITENS AUTOMOTIVE PARTNERSHIP, Woodbridge (CA)

(72) Inventors: Mahdi Tafreshnia, Maple (CA); Harley Cooper, Tottenham (CA)

(73) Assignee: LITENS AUTOMOTIVE PARTNERSHIP, Woodbridge (CA)

(*) Notice: Subject to any disclaimer, the term of this patent is extended or adjusted under 35 U.S.C. 154(b) by 0 days.

(21) Appl. No.: 18/249,883

(22) PCT Filed: Nov. 19, 2021

(86) PCT No.: PCT/CA2021/051650
§ 371 (c)(1),
(2) Date: Apr. 20, 2023

(87) PCT Pub. No.: WO2022/104478
PCT Pub. Date: May 27, 2022

(65) Prior Publication Data
US 2023/0383795 A1    Nov. 30, 2023

Related U.S. Application Data

(60) Provisional application No. 63/116,161, filed on Nov. 19, 2020.

(51) Int. Cl.
*F16D 7/02*     (2006.01)
*B60K 25/02*    (2006.01)
*F16D 41/20*    (2006.01)

(52) U.S. Cl.
CPC .............. *F16D 7/022* (2013.01); *B60K 25/02* (2013.01); *F16D 41/206* (2013.01); *B60K 2025/022* (2013.01)

(58) Field of Classification Search
CPC .................. F16D 41/206; F16D 7/02–022
See application file for complete search history.

(56) References Cited

U.S. PATENT DOCUMENTS 7,712,592 B2     5/2010  Jansen et al.
2008/0194339 A1*  8/2008  Antchak ............ F16D 7/022
                                                  464/40

(Continued)

FOREIGN PATENT DOCUMENTS

EP          3244083 A1 * 11/2017 ............. F16D 3/12

OTHER PUBLICATIONS

International Search Report and Written Opinion for PCT/CA2021/051650 mailed Jan. 26, 2022.

(Continued)

*Primary Examiner* — Ernesto A Suarez
*Assistant Examiner* — Lillian T Nguyen
(74) *Attorney, Agent, or Firm* — Aird & McBurney LP (57) ABSTRACT

In an aspect, a decoupler is provided for mounting to a shaft in an accessory drive between an engine and an accessory in a vehicle. The decoupler includes a pulley, a hub, a wrap spring clutch, an isolation spring, and a carrier that is positioned to hold an end of the wrap spring clutch and an end of the isolation spring. The carrier has a slot for holding the end of the wrap spring clutch and wherein the slot has a slot exit through which the wrap spring clutch exits from the slot to wrap around an exterior of the carrier. The carrier has a bridge configured to fail before the end wall fails. This permits the carrier to open radially so as to bring the end wall into abutment with a wall of the pulley reducing stress in the end wall.

4 Claims, 9 Drawing Sheets

(56) References Cited

U.S. PATENT DOCUMENTS

2015/0122610 A1    5/2015  Antchak et al.
2015/0345575 A1*  12/2015  Antchak ................ F16H 55/36
                                                            474/94

OTHER PUBLICATIONS

International Preliminary Report on Patentability for PCT/CA2021/051650 mailed May 16, 2023.

* cited by examiner

DECOUPLER FOR ENDLESS DRIVE ARRANGEMENT

CROSS-REFERENCE TO RELATED APPLICATIONS

This application claims the benefit of U.S. Provisional Application No. 63/116,161, filed Nov. 19, 2020, the contents of which are incorporated herein by reference in their entirety.

FIELD OF THE DISCLOSURE

This disclosure relates generally to the field of decouplers, which allow items that are operatively connected to an endless drive member (such as an engine crankshaft and input shafts for belt-drive accessories on a vehicle engine) to operate temporarily at a speed other than the speed of the endless drive member, and more particularly to carriers for decouplers, which hold both a wrap spring clutch and an isolation spring.

BACKGROUND

It is known to provide a decoupler mechanism on an accessory, such as an alternator, that is driven by a belt from the crankshaft of an engine in a vehicle. Such a decoupling mechanism, which may be referred to as a decoupler assembly or a decoupler, permits the associated accessory to operate temporarily at a speed that is different than the speed of the belt. As is known, the crankshaft undergoes cycles of accelerations and decelerations associated with the firing of the cylinders in the engine. The decoupler permits the alternator shaft to rotate at a relatively constant speed even though the crankshaft from the engine, and hence, the pulley of the decoupler, will be subjected to these same cycles of decelerations and accelerations, commonly referred to as rotary torsional vibrations, or torsionals.

A carrier has been employed in decouplers for some time, where a wrap spring clutch is used. The carrier holds an end of a wrap spring clutch and also an end of an isolation spring, helping to keep the assembly together. It has been found, however, that failures have occurred in the carrier 30, over time, after many cycles of torque transfer through the decoupler. It would be advantageous to provide a decoupler that has an increased resistance to failure.

SUMMARY

In an aspect, a decoupler is provided for mounting to a shaft and engaging an endless drive member in an endless drive arrangement for transmitting power between an engine and at least one accessory in a vehicle. The decoupler includes a decoupler input member and a decoupler output member that is rotatable relative to the decoupler input member. One of the decoupler input member and the decoupler output member is shaped to engage with the endless drive member. The decoupler further includes a wrap spring clutch and an isolation spring that are positioned to transfer torque in series between the decoupler input member and the decoupler output member, and a carrier that is positioned to hold an end of the wrap spring clutch and an end of the isolation spring so as to permit torque transfer between the end of the wrap spring clutch and the end of the isolation spring. The carrier has a slot for holding the end of the wrap spring clutch. The slot has a slot exit through which the wrap spring clutch exits from the slot to wrap around an exterior of the carrier. The slot exit is defined on a radially exterior side thereof by an end wall of the carrier. During torque transfer through the decoupler between the decoupler input member and the decoupler output member, the end of the wrap spring clutch is positioned to apply a clutch-related radial force on the end wall, and the isolation spring is positioned to apply an isolation spring-related force on the carrier that is at least partially opposed to the clutch-related radial force. The carrier has a circumference and includes a bridge at a selected position about the circumference. The bridge has a selected cross-sectional area in a circumferential direction. The selected cross-sectional area is selected so as to generate a higher stress in the bridge than at the end wall during exertion of the clutch-related radial force and the isolation spring-related force on the carrier, so as to cause failure of the bridge before failure of the end wall, in order to permit the carrier to flex open radially under the clutch-related radial force and the isolation spring-related force so as to bring the end wall radially outward into abutment with a wall of one of the decoupler input member and the decoupler output member.

BRIEF DESCRIPTION OF THE DRAWINGS

The foregoing and other aspects of the invention will be better appreciated with reference to the attached drawings, wherein.

DETAILED DESCRIPTION OF EXAMPLE EMBODIMENTS

Figure 1:
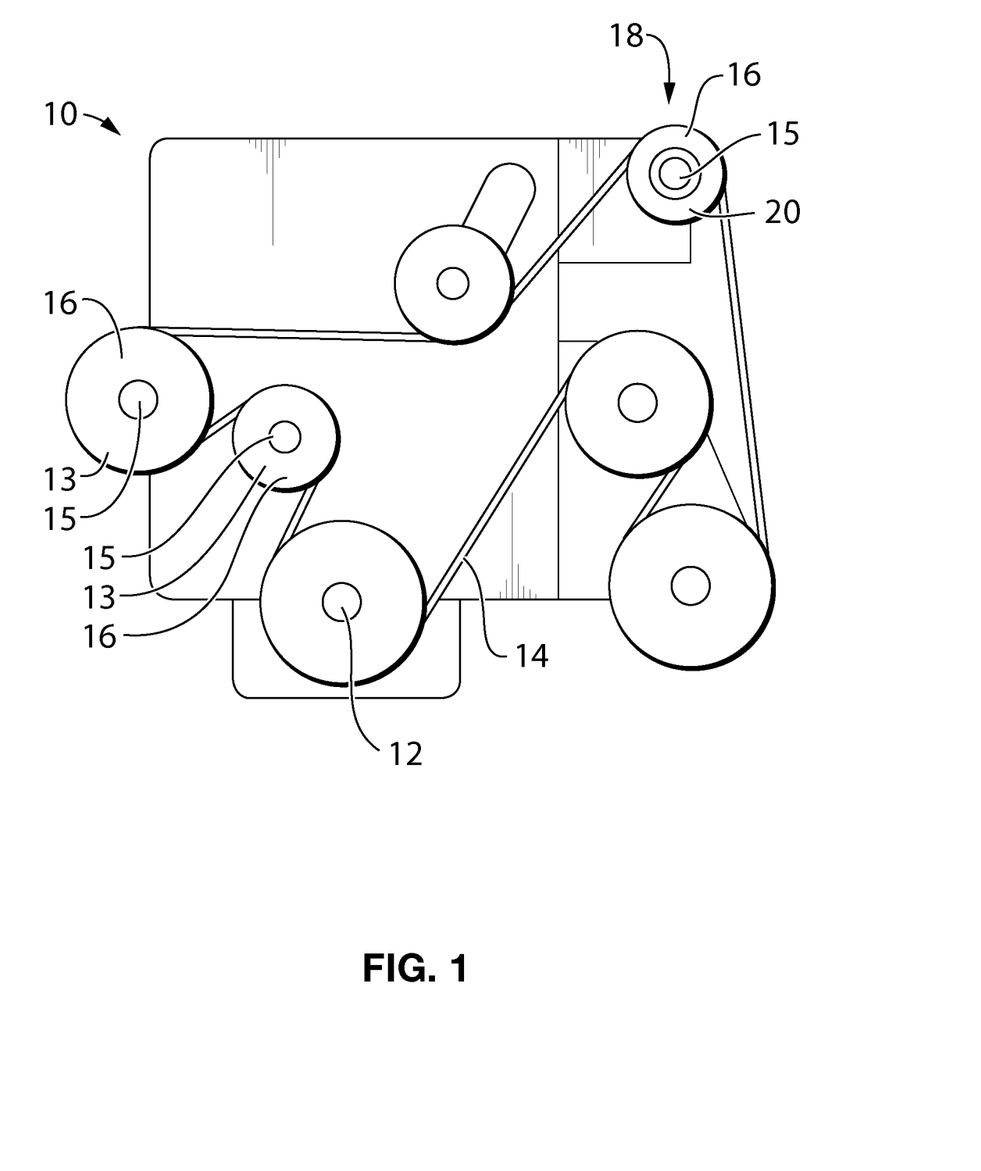
FIG. 1 is an elevation view of an engine with a belt drive with a decoupler in accordance with an embodiment of the present disclosure.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as an alternator 18. Each accessory 16 includes an input drive shaft 15 with a pulley 13 thereon, which is driven by the belt 14. A decoupler 20 is provided instead of a pulley, between the belt 14 and the input shaft 15 of any one or more of the belt driven accessories 16, and in particular the alternator 18.

Figure 2:
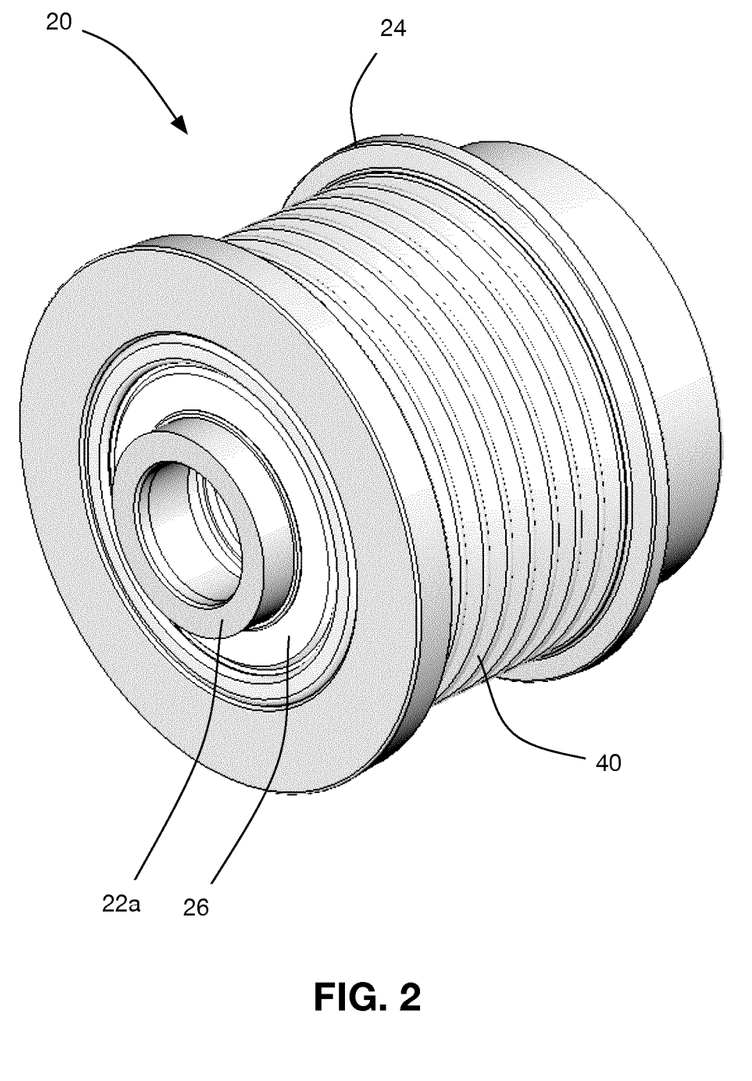
FIG. 2 is a perspective view of the decoupler shown in FIG. 1.
Figure 3A:
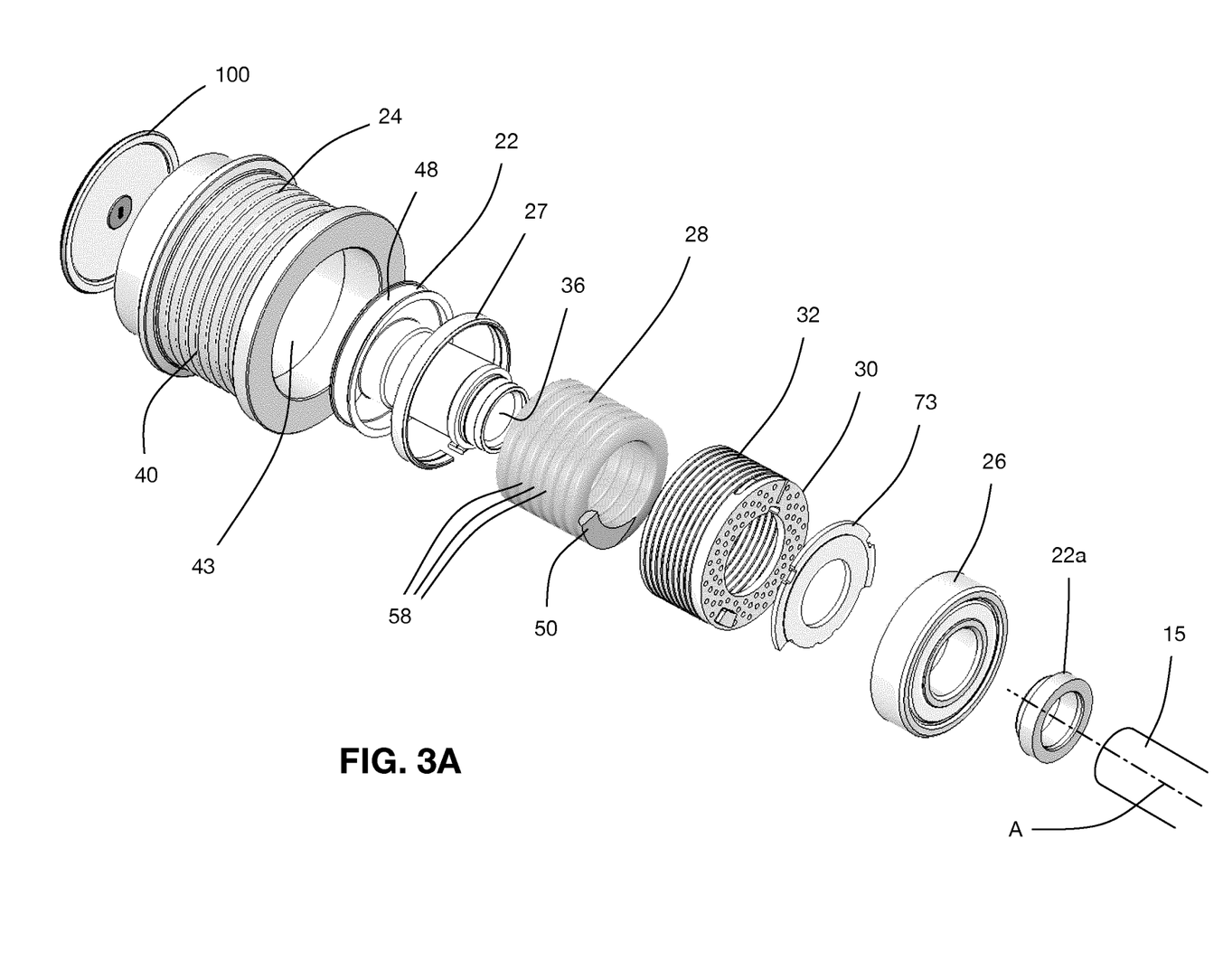
FIG. 3A is an exploded perspective view of the decoupler shown in FIG. 2.
Figure 3B:
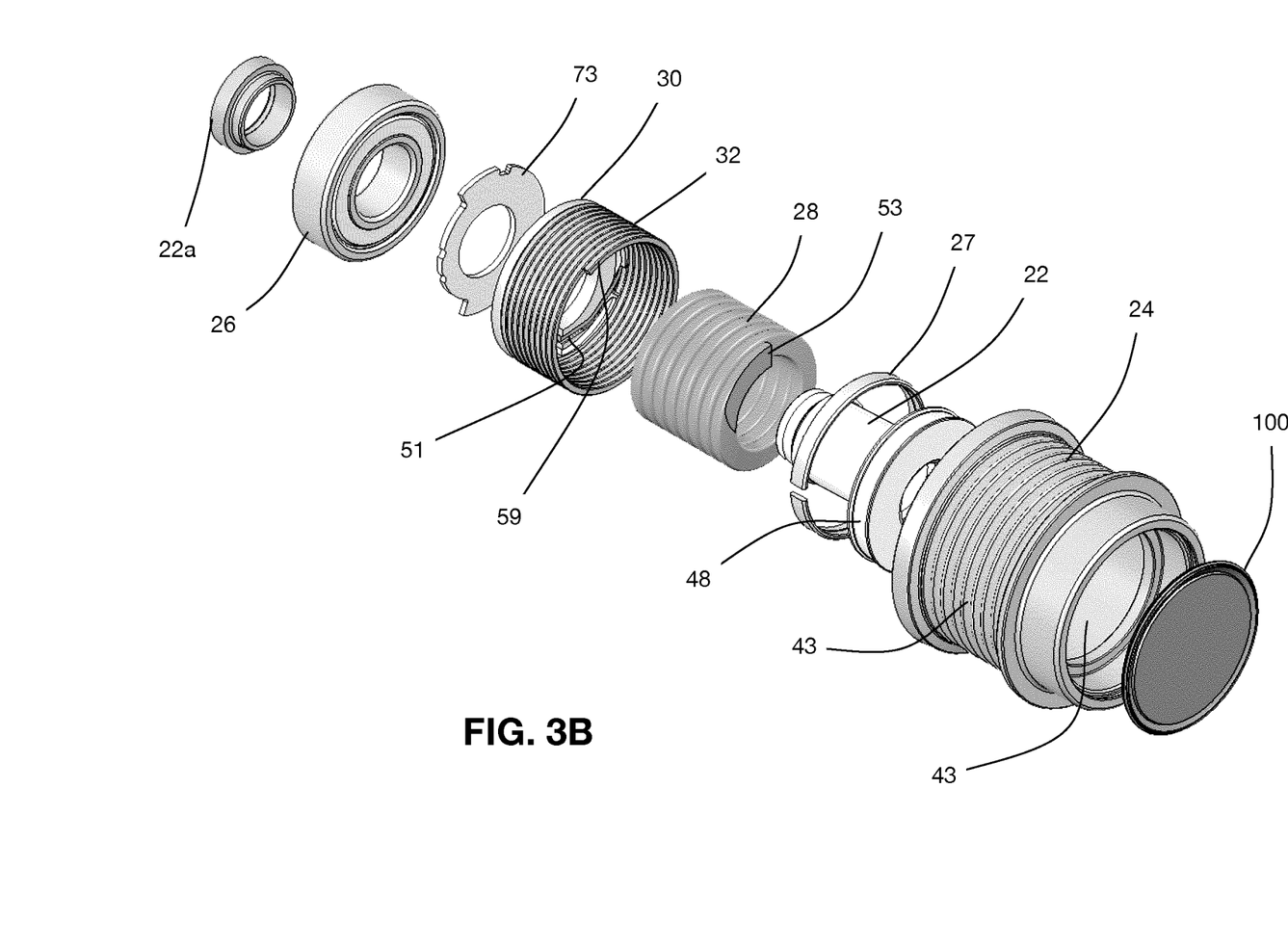
FIG. 3B is another exploded perspective view of the decoupler shown in FIG. 2.

Reference is made to FIGS. 2, 3A and 3B, which show a perspective assembled view, and two exploded perspective views respectively of the decoupler 20. The decoupler 20 includes a hub 22, a pulley 24, a first bearing member 26, a second bearing member 27, an isolation spring 28, a carrier 30, and a wrap spring clutch 32.

The hub 22 may be adapted to mount to the accessory shaft 15 (FIG. 1) in any suitable way. For example, the hub 22 may have a shaft-mounting aperture 36 therethrough that is used for the mounting of the hub 22 to the end of the shaft 15, for co-rotation of the hub 22 and the shaft 15 about an axis A (FIG. 3).

The pulley 24 is rotatably mounted to the hub 22. The pulley 24 has an outer surface 40 which is configured to engage the belt 14. The outer surface 40 is shown as having grooves 42. The belt 14 may thus be a multiple-V belt. It will be understood however, that the outer surface 40 of the pulley 24 may have any other suitable configuration and the belt 14 need not be a multiple-V belt. For example, the pulley 24 could have a single groove and the belt 14 could be a single V belt, or the pulley 24 may have a generally flat portion for engaging a flat belt 14. The pulley 24 further includes an inner surface 43, which the wrap spring clutch 32 may engage in order to couple the pulley and hub 22 together. The pulley 24 may be made from any suitable material, such as a steel, or aluminum, or in some cases a polymeric material, such as certain types of nylon, phenolic or other materials.

The first bearing member 26 rotatably supports the pulley 24 on the hub 22 at a first (proximal) axial end of the pulley 24. The first bearing member 26 may be any suitable type of bearing member, such as a ball bearing. In the embodiment shown, the first bearing member 26 is supported partially on the hub 22 and partially on a add-on member 22a that is optionally provided. In other embodiments, the hub 22 extends all the way through the first bearing member 26.

The second bearing member 27 is positioned at a second (distal) axial end of the pulley 24 so as to rotatably support the pulley 24 on a pulley support surface 48 of the hub 22. The second bearing member 27 may mount to the pulley 24 and to the hub 22 in any suitable ways. In the embodiment shown, the second bearing member 27 may be molded around the pulley support surface 48 by an injection molding process wherein the hub 22 forms part of the mold. The hub 22 may have a coating thereon prior to insertion into the mold cavity, to prevent strong adherence of the bearing member 27 to the pulley support surface 48 during the molding process, so that after removal of the hub 22 and bearing member 27 from the molding machine (not shown), the bearing member 27 can rotate about the hub 22. It will be noted that other ways of joining the second bearing member 27 and the pulley 24 may be employed, such as adhesive bonding, and/or using mechanical joining elements (e.g. resilient locking tabs) that would lock the bearing member 27 to the pulley.

The isolation spring 28 is provided to accommodate oscillations in the speed of the belt 14 relative to the shaft 15. The isolation spring 28 may be a helical torsion spring that has a first helical end 50 that is held on a helical support surface 55 and that abuts a radially extending driver wall 52 (FIG. 4) on the carrier 30. The isolation spring 28 has a second helical end 53 (FIG. 3B) that engages a similar driver wall (not shown) on the hub 22. In the embodiment shown, the isolation spring 28 has a plurality of coils 58 between the first and second ends 50 and 53. The coils 58 are preferably spaced apart by a selected amount and the isolation spring 28 is preferably under a selected amount of axial compression installed in the decoupler 20, to ensure that the first and second helical ends 50 and 53 of the spring 28 are abutted with the respective driver walls on the carrier 30 and hub 22. An example of a suitable engagement between the isolation spring 28, the hub 22 and the carrier 30 is shown and described in U.S. Pat. No. 7,712,592, the contents of which are incorporated herein by reference. A thrust plate 73 may be provided to receive the axial thrust force of the carrier 30 resulting from the axial compression of the spring 28.

The isolation spring 28 may be made from any suitable material, such as a suitable spring steel. The isolation spring 28 may have any suitable cross-sectional shape. In the figures, the isolation spring 28 is shown as having a generally rectangular cross-sectional shape, which provides it with a relatively high torsional resistance (i.e. spring rate) for a given occupied volume. However, a suitable spring rate may be obtained with other cross-sectional shapes, such as a circular cross-sectional shape or a square cross-sectional shape.

Alternatively, the isolation spring 28 may be compression spring. As a further alternative, the isolation spring 28 may be one of two or more isolation springs, each of which is a compression spring. Such a configuration is shown in U.S. Pat. No. 7,708,661 and US Patent application publication no. US2008/0312014, PCT publication no. WO2007/074016, PCT publication no. WO2008/022897, PCT publication no. WO2008/067915, and PCT publication no. WO2008/071306, the disclosures of all of which are hereby incorporated by reference in their entirety.

The helical wrap spring clutch 32 has a first end 51 that is engageable with a radial wall 55 of the carrier 30 and that may be fixedly connected to the carrier 30. The helical wrap spring clutch 32 has a second end 59 that may be free floating. The carrier 30 may be made from any suitable material such as, for example, a suitable nylon or the like.

When a torque is applied from the belt 14 to the pulley 24 to drive the pulley 24 at a speed that is faster than that of the shaft 15, friction between the inner surface 43 of the pulley 24 and the coils of the wrap spring clutch 32 drives at least one of the coils of the wrap spring clutch 32 at least some angle in a first rotational direction about the axis A, relative to the first end 51 of the wrap spring clutch 32. The relative movement between the one or more coils driven by the pulley 24 relative to the first end 51 causes the clutch spring to expand radially, which further strengthens the grip between the coils of the wrap spring clutch 32 and the inner surface 43 of the pulley 24. As a result, the first end 59 of the wrap spring clutch 32 transmits the torque from the pulley to the carrier 30. The carrier 30 transmits the torque to the hub 22 through the isolation spring 28. As a result, the hub 22 is brought up to the speed of the pulley 24. Thus, when the pulley 24 rotates faster than the hub 22, the wrap spring clutch 32 operatively connects the pulley 24 to the carrier 30 and therefore to the hub 22.

A dust shield 100 is mountable to the pulley to inhibit dust and debris from migrating into the decoupler 20 during operation.

Figure 4:
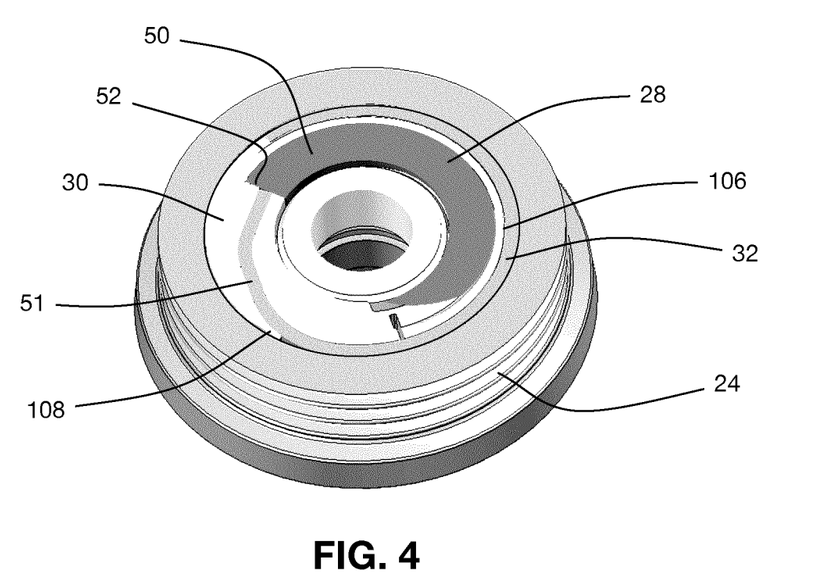
FIG. 4 is a sectional perspective view of the decoupler shown in FIG. 2.
Figure 5A:
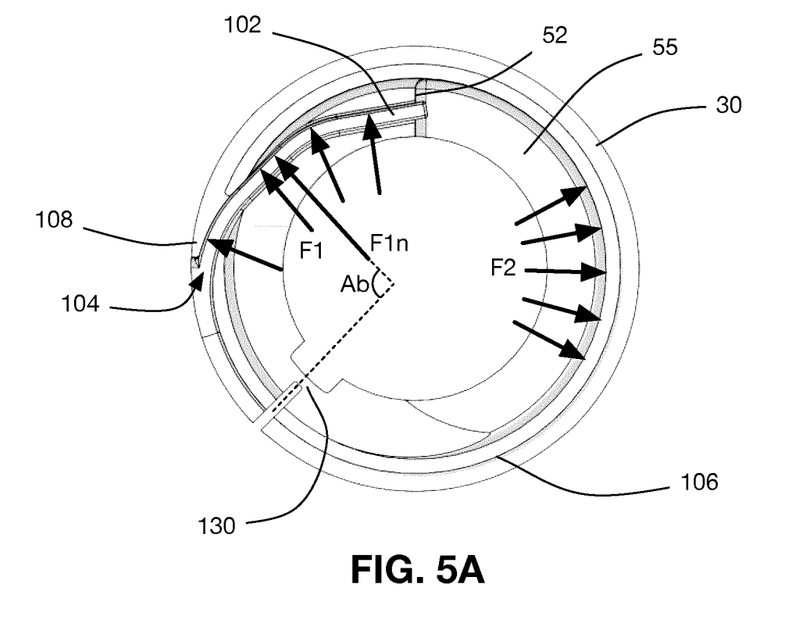
FIG. 5A is a plan view of a carrier that is part of the decoupler shown in FIG. 2.
Figures 5B, 6:
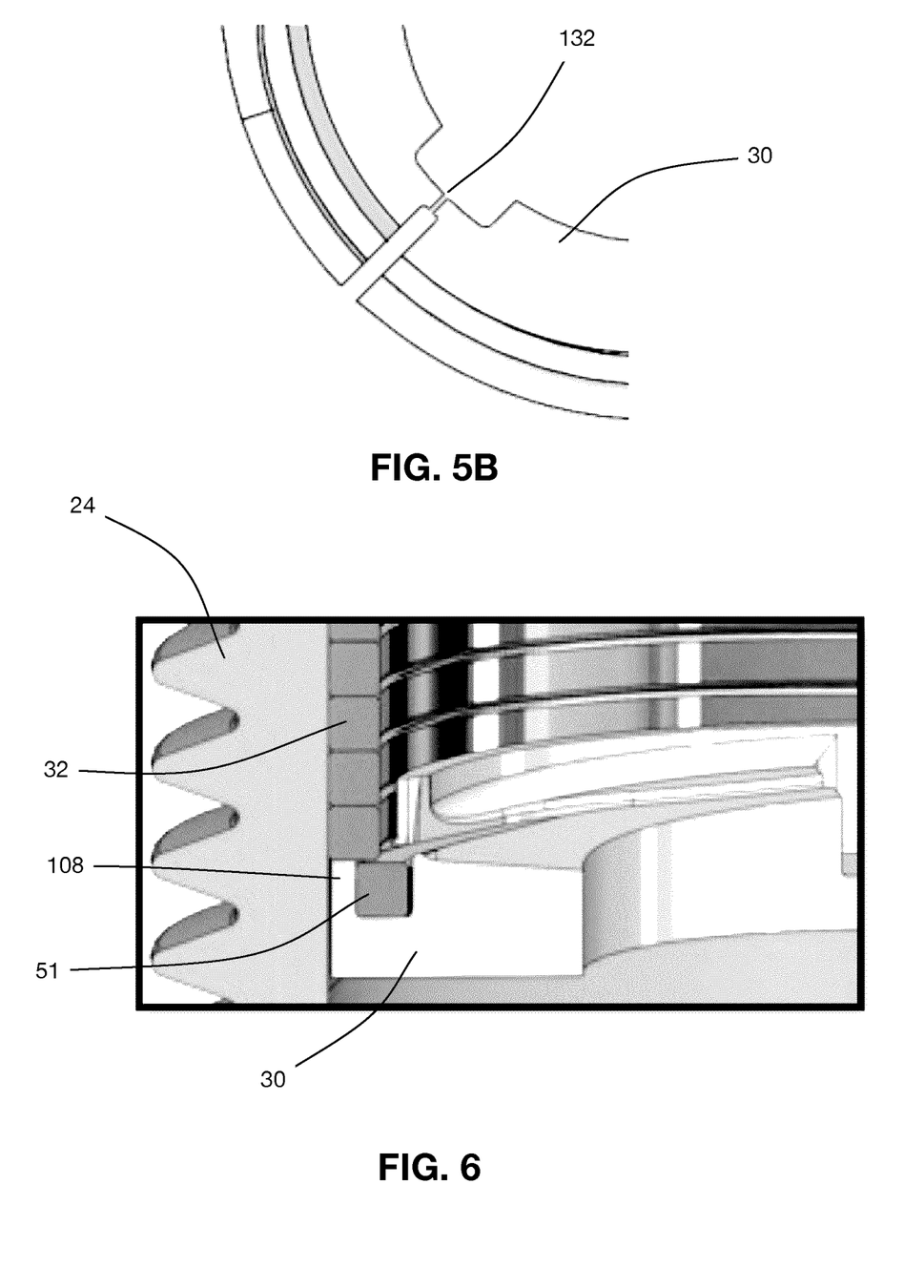
FIG. 5B is a magnified view of a portion of the carrier shown in FIG. 5A.
FIG. 6 is a perspective sectional view of a portion of the decoupler shown in FIG. 1.

The interaction of the carrier 30 and the wrap spring clutch 32 is described in further detail below. The carrier 30 has a slot 102 (FIG. 5A) for holding the first end 51 of the wrap spring clutch 32. The slot 102 has a slot exit 104 through which the wrap spring clutch 32 exits from the slot 102 to wrap around an exterior of the carrier 30 (shown at 106). The slot exit 104 is defined on a radially exterior side thereof by an end wall 108 of the carrier 30. As can be seen in FIGS. 4, 5A, and 6, the end wall 108 is only supported at its base, to the rest of the carrier 30.

During torque transfer through the decoupler 20 between the pulley 24 and the hub 22, the first end 51 of the wrap spring clutch 32 is positioned to apply a clutch-related radial force F1 on the end wall 108, and the isolation spring 28 is positioned to apply an isolation spring-related force F2 on the carrier 30 that is at least partially opposed to the clutch-related radial force F1. These forces F1 and F2 are distributed forces, and so they are represented by multiple arrows in FIG. 5A.

Figure 7A:
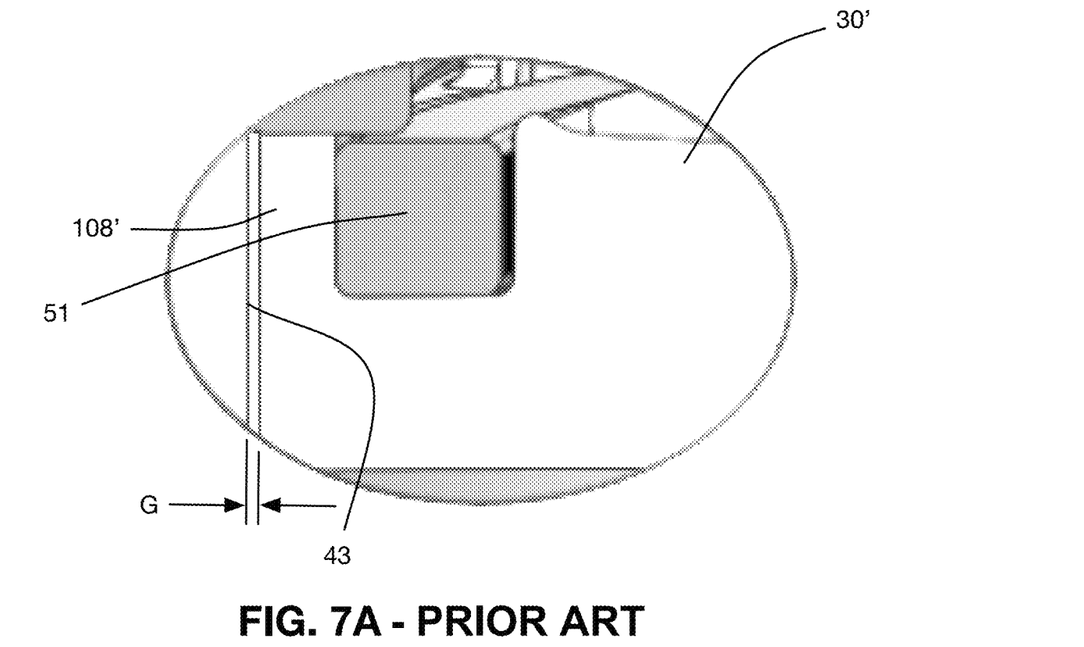
FIG. 7A is a magnified sectional view of a portion of a decoupler prior to torque transfer, including a carrier of the prior art.
Figure 7B:
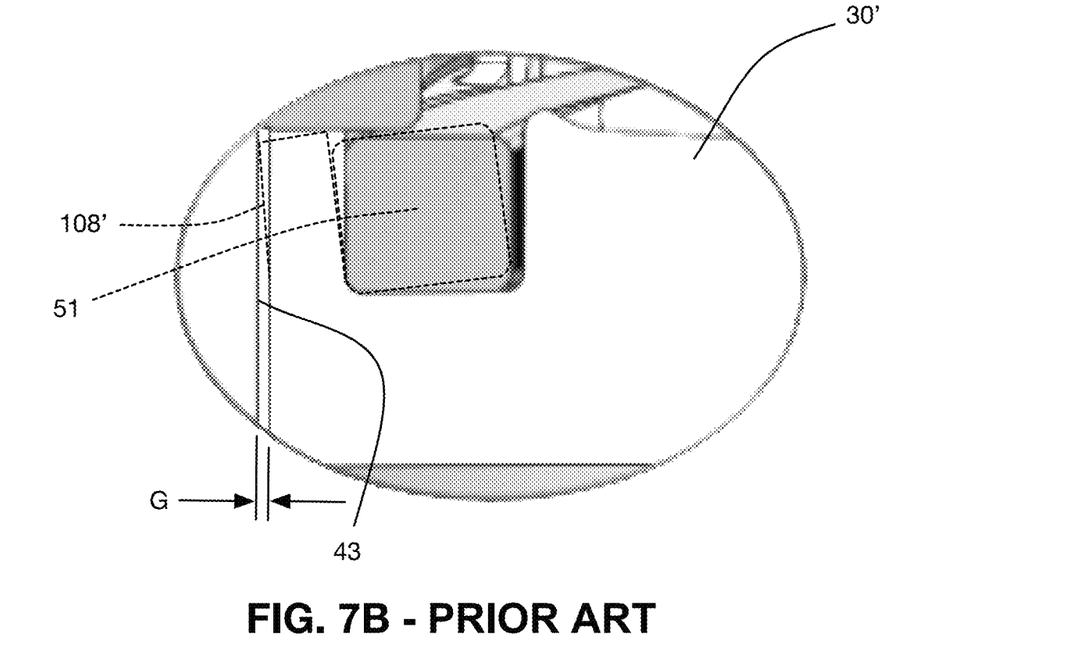
FIG. 7B is a magnified sectional view of a portion of the decoupler shown in FIG. 7A during torque transfer.
Figure 9:
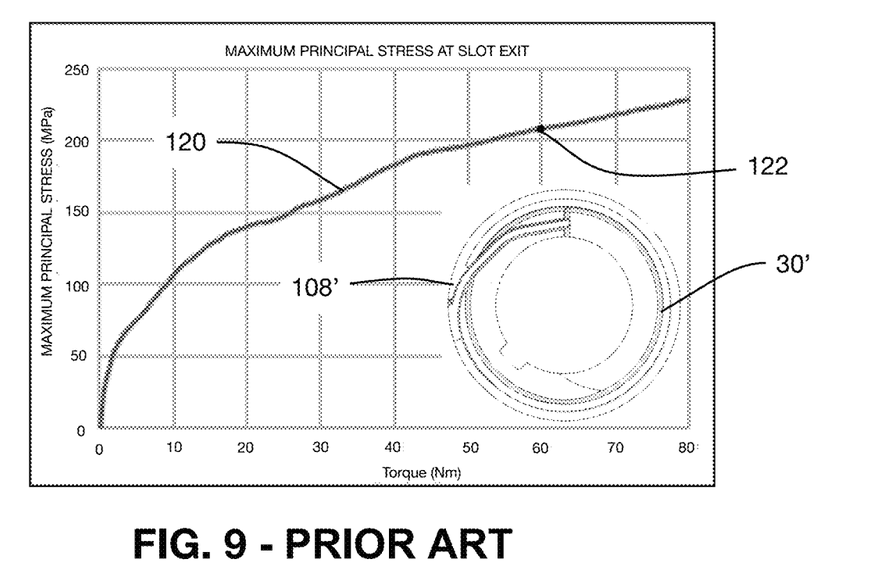
FIG. 9 is a graph showing stresses incurred during torque transfer through a decoupler with the prior art carrier shown in FIGS. 7A and 7B along with an illustration of the prior art carrier.

FIGS. 7A and 7B are magnified views of a prior art carrier 30' and the inner surface 43 of the pulley 24. The entirety of the prior art carrier 30' is shown more clearly in FIG. 9. It can be seen that there is a small gap shown at G between the end wall 108' of the prior art carrier 30' and the inner surface 43 of the pulley 24. As a result of the gap G in the prior art carrier 30' the clutch-related radial force F1 would result in radially outward flexure (bending) of the end wall 108' towards the inner surface 43 of the pulley 24, the first end 51 of the wrap spring clutch 32 would bend as needed at least locally where the prior art end wall 108' has flexed. The flexure of the first end 51 and of the end wall 108' are represented by dashed outlines in FIG. 7B. A graph shown in FIG. 9 shows a curve 120 that represents a relationship between the highest stress incurred in the prior art carrier 30', and the torque transfer through a prior art decoupler that has the prior art carrier 30'. The highest stress is incurred at the base of the end wall 108'. As can be seen, at 60 Nm of torque, which is a torque that can be transmitted in certain situations, such as, for example, a cold engine start, the maximum stress incurred is approximately 209 MPa (see point 122 on the curve 120). Repeated torque transfer through a decoupler with the prior art carrier 30' ultimately can cause a failure of the carrier 30' at the base of the end wall 108' due to fatigue.

Figure 8A:
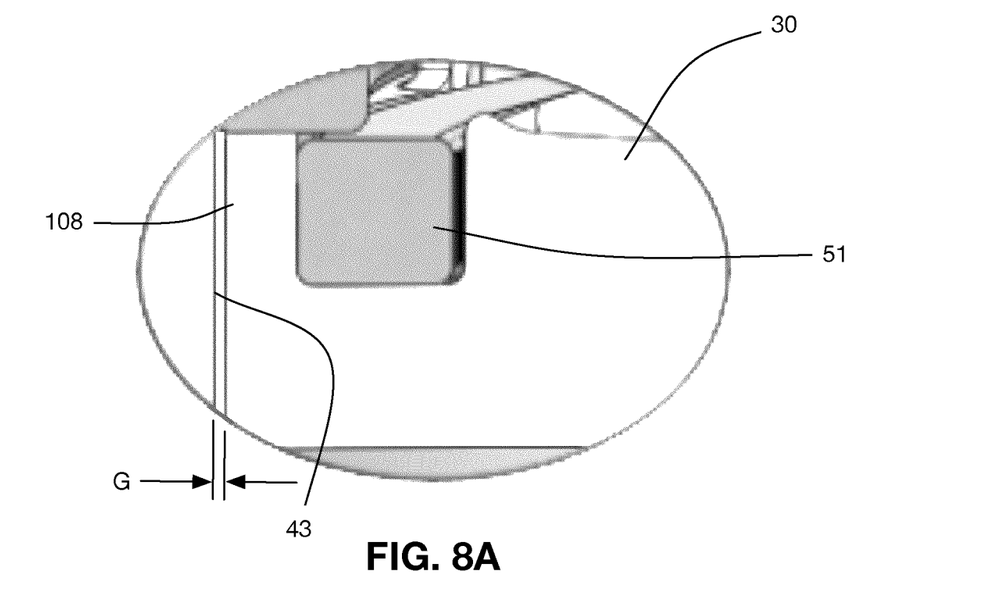
FIG. 8A is a magnified sectional view of a portion of the decoupler shown in FIG. 2, prior to torque transfer, including a carrier in accordance with the present disclosure.
Figure 8B:
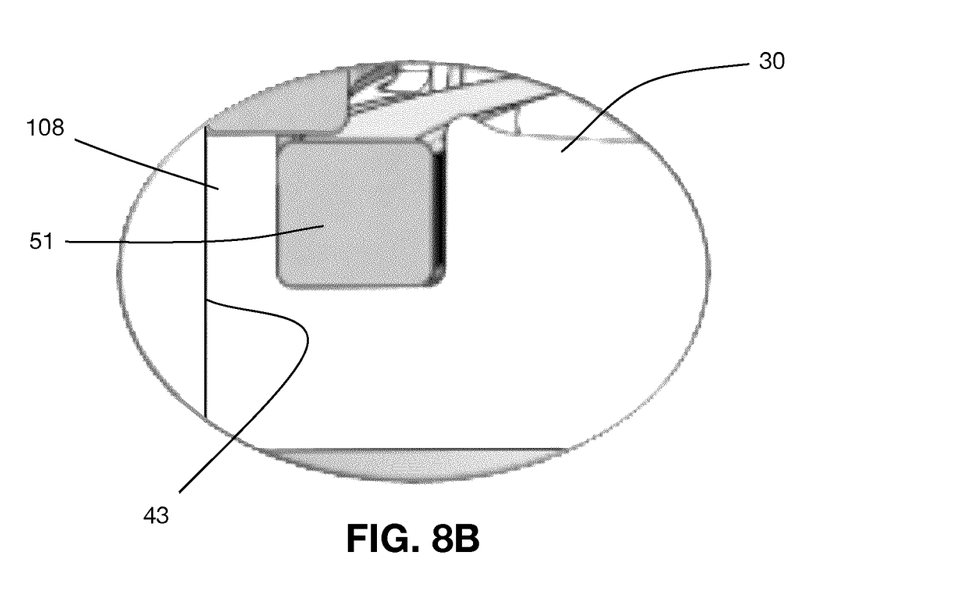
FIG. 8B is a magnified sectional view of a portion of the decoupler shown in FIG. 8A during torque transfer.
Figure 10:
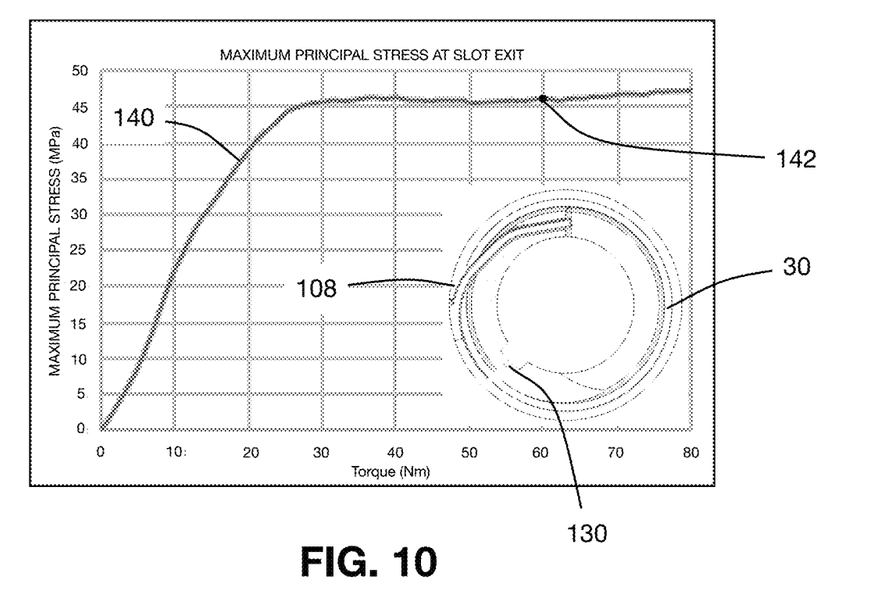
FIG. 10 is a graph showing stresses incurred during torque transfer through the decoupler shown in FIG. 2 along with an illustration of the carrier.

For the carrier 30, as can be seen in FIG. 5A, the carrier 30 has a circumference and includes a bridge 130 at a selected position about the circumference. In the example embodiment shown, the bridge 130 is approximately at an angle Ab of 90 degrees angularly from a net force F1n that is the sum of the distributed force F1. By approximately 90 degrees, the angle Ab may be anywhere from 60 degrees to 120 degrees from the net force Fin. However, in other embodiments, the bridge 130 may be positioned anywhere reasonable about the circumference of the carrier 30 that permits the carrier 30 to open radially to bring the end wall 108 into abutment with the inner surface 43 of the pulley 24. The bridge 130 is a sacrificial connection in the carrier 30 and is intended in at least some embodiments to break after installation when a selected torque is transmitted to the decoupler 20. In some embodiments, when the decoupler 20 is assembled the bridge 130 is still present, and so there is still the gap G present between the end wall 108 and the inner surface 43 of the pulley 24 (FIG. 8A). After breaking the bridge 130, a split 132 (FIG. 5A) is present in the carrier 30 where the bridge 130 was. As a result, when torque is transferred through the decoupler 20 and the first end 51 of the wrap spring clutch 32 applies the force F1 a portion of which against the end wall 108, the carrier 30 is relatively free to expand radially to consume the gap G until the end wall 108 is braced against the inner surface 43 of the pulley 24, as shown in FIG. 8B. As a result, the bending forces that were applied to the end wall 108' in the prior art carrier 30' are effectively eliminated and the end wall 108 is simply in compression between the first end 51 of the wrap spring clutch 32 and the inner surface 43 of the pulley 24. FIG. 10 shows a curve 140 that represents a relationship between the highest stress incurred in the carrier 30 at the base of the end wall 108, and the torque transfer through the decoupler that has the carrier 30. As can be seen, at 60 Nm of torque, the maximum stress incurred is approximately 46 MPa, (i.e. a reduction of about 78% as compared to the prior art carrier 30'), shown at point 142 on the curve 140.

In order for the carrier 30 containing the bridge 130 to provide an improvement over a prior art carrier 30', the bridge 130 need only be shaped to fail before the base of the end wall 108. To this end, the bridge 130 has a selected cross-sectional area in the circumferential direction, which is selected so as to generate a higher stress in the bridge 130 than at the end wall 108 during exertion of the clutch-related radial force F1 and the isolation spring-related force F2 on the carrier 30, so as to cause failure of the bridge 130 before failure of the end wall 108. As noted above in relation to FIG. 8B, failure of the bridge 130 permits the carrier 30 to flex open radially under the clutch-related radial force F1 and the isolation spring-related force F2 so as to bring the end wall 108 radially outward into abutment with a wall (i.e. the inner surface 43 of the pulley 24).

In the embodiment shown, the bridge 130 may have a cross-sectional area of about 1 mm in the radial direction by about 3.5 mm in the axial direction for a total cross-sectional area in the circumferential direction of about 3.5 mm^2. Other cross-sectional areas for the bridge 130 may be used, depending on the torque at which it is desired for the bridge 130 to fail at.

In some embodiments it may be desired for the bridge 130 to fail at a torque transfer of about 35 Nm, which may be sufficiently below the torque transfer through the decoupler 20 during a cold engine start of the engine 10 (which may be, for example, about 40 Nm). In other embodiments, the bridge 130 may have a cross-sectional area that is selected to cause failure of the bridge 130 at a different torque transfer through the decoupler 20.

While a pulley 24 and a hub 22 are shown, any suitable decoupler input member and a decoupler output member may be provided. In some embodiments, for example, such as an embodiment in which the decoupler 20 is mounted to the crankshaft 12, the pulley 24 would constitute a decoupler output member and the hub 22 that mounts to the crankshaft 12 would constitute a decoupler input member.

While the description contained herein constitutes a plurality of embodiments of the present invention, it will be appreciated that the present invention is susceptible to further modification and change without departing from the fair meaning of the accompanying claims.

What is claimed is:

1. A decoupler for mounting to a shaft and engaging an endless drive member in an endless drive arrangement for transmitting power between an engine and at least one accessory in a vehicle, the decoupler comprising:
    a decoupler input member and a decoupler output member that is rotatable relative to the decoupler input member, wherein one of the decoupler input member and the decoupler output member is shaped to engage with the endless drive member;

a wrap spring clutch and an isolation spring that are positioned to transfer torque in series between the decoupler input member and the decoupler output member; and a carrier that is positioned to hold an end of the wrap spring clutch and an end of the isolation spring so as to permit torque transfer between the end of the wrap spring clutch and the end of the isolation spring, wherein the carrier has a slot for holding the end of the wrap spring clutch and wherein the slot has a slot exit through which the wrap spring clutch exits from the slot to wrap around an exterior of the carrier, wherein the slot exit is defined on a radially exterior side thereof by an end wall of the carrier, wherein, during torque transfer through the decoupler between the decoupler input member and the decoupler output member, the end of the wrap spring clutch is positioned to apply a clutch-related radial force on the end wall, and the isolation spring is positioned to apply an isolation spring-related force on the carrier that is at least partially opposed to the clutch-related radial force, and wherein the carrier has a circumference and includes a bridge at a selected position about the circumference, wherein the bridge has a selected cross-sectional area in a circumferential direction, wherein the selected cross-sectional area is selected so as to generate a higher stress in the bridge than at the end wall during exertion of the clutch-related radial force and the isolation spring-related force on the carrier, so as to cause failure of the bridge before failure of the end wall, in order to permit the carrier to flex open radially under the clutch-related radial force and the isolation spring-related force so as to bring the end wall radially outward into abutment with a wall of one of the decoupler input member and the decoupler output member.

2. A decoupler as claimed in claim 1, wherein the selected cross-sectional area is selected to cause failure of the bridge at a torque transfer that is less than a torque transfer through the decoupler during a start of the engine.

3. A decoupler as claimed in claim 1, wherein the selected cross-sectional area is selected to cause failure of the bridge at a torque transfer of less than Nm.

4. A decoupler as claimed in claim 1, wherein the bridge is positioned approximately 90 degrees from a net force that represents the sum of the clutch-related radial force.

\* \* \* \* \*